United States Patent
Hinami et al.

(10) Patent No.: US 10,311,318 B2
(45) Date of Patent: Jun. 4, 2019

(54) REFERENCE LINE SETTING DEVICE, REFERENCE LINE SETTING METHOD AND REFERENCE LINE SETTING PROGRAM

(71) Applicant: Rakuten, Inc., Tokyo (JP)

(72) Inventors: Ryota Hinami, Tokyo (JP); Naoki Chiba, Tokyo (JP)

(73) Assignee: Rakuten, Inc., Setagaya-ku, Tokyo (JP)

(*) Notice: Subject to any disclaimer, the term of this patent is extended or adjusted under 35 U.S.C. 154(b) by 0 days.

(21) Appl. No.: 15/554,031

(22) PCT Filed: Jul. 17, 2015

(86) PCT No.: PCT/JP2015/070600
§ 371 (c)(1),
(2) Date: Aug. 28, 2017

(87) PCT Pub. No.: WO2017/013720
PCT Pub. Date: Jan. 26, 2017

(65) Prior Publication Data
US 2018/0046873 A1    Feb. 15, 2018

(51) Int. Cl.
G06T 7/10      (2017.01)
G06K 9/32      (2006.01)
G06K 9/48      (2006.01)
G06K 9/46      (2006.01)
G06T 1/00      (2006.01)

(52) U.S. Cl.
CPC .......... G06K 9/325 (2013.01); G06K 9/4642 (2013.01); G06K 9/481 (2013.01); G06K 2009/484 (2013.01); G06K 2209/01 (2013.01); G06T 1/0007 (2013.01)

(58) Field of Classification Search
CPC ....... G06K 9/325; G06K 9/4642; G06K 9/481
See application file for complete search history.

(56) References Cited

U.S. PATENT DOCUMENTS

| 6,751,779 | B1 * | 6/2004 | Kurosawa | .......... G06K 9/00463 715/209 |
| 7,567,730 | B2 * | 7/2009 | Ohguro | ................ G06K 9/3208 382/190 |
| 8,588,529 | B2 | 11/2013 | Nykyforov | |
| 8,730,244 | B2 * | 5/2014 | Yamazaki | .......... G01C 21/3673 345/467 |

(Continued)

*Primary Examiner* — Gregory M Desire
(74) *Attorney, Agent, or Firm* — Sughrue Mion, PLLC

(57) ABSTRACT

A reference line setting device includes an image acquisition means to acquire an image containing a character region, a recognition means to recognize characters from the character region of the image by a specified recognition method, a line position information acquisition means to acquire line position information of a plurality of characters out of the characters recognized by the recognition means with reference to a storage means storing, for each character, line position information concerning a position which at least two reference lines pass through in a vertical direction of characters, the reference lines being lines drawn in an alignment direction of characters, along which a certain part of each character is to be placed, and a setting means to set each of the reference lines to the image based on a plurality of line position information for each reference line acquired by the line position information acquisition means.

11 Claims, 9 Drawing Sheets

(56) References Cited

U.S. PATENT DOCUMENTS

| | | | |
|---|---|---|---|
| 2002/0031264 A1* | 3/2002 | Fujimoto | G06K 9/00463 382/199 |
| 2005/0163396 A1* | 7/2005 | Morichika | H04N 1/195 382/275 |
| 2008/0085051 A1* | 4/2008 | Yoshii | G06K 9/3266 382/182 |
| 2010/0125787 A1* | 5/2010 | Chihara | G06F 3/04883 715/702 |
| 2016/0005202 A1* | 1/2016 | Yamazaki | G06K 9/00449 382/229 |
| 2018/0046873 A1* | 2/2018 | Hinami | G06K 9/325 |

* cited by examiner

*Fig.4*

| CHARACTER SET | ASCENDER LINE | | MEAN LINE | | BASE LINE | | DESCENDER LINE | |
|---|---|---|---|---|---|---|---|---|
| | MEAN | VARIANCE | MEAN | VARIANCE | MEAN | VARIANCE | MEAN | VARIANCE |
| A | $CA_A$ | $VA_A$ | $CM_A$ | $VM_A$ | $CB_A$ | $VB_A$ | $CD_A$ | $VD_A$ |
| B | $CA_B$ | $VA_B$ | $CM_B$ | $VM_B$ | $CB_B$ | $VB_B$ | $CD_B$ | $VD_B$ |
| C | $CA_C$ | $VA_C$ | $CM_C$ | $VM_C$ | $CB_C$ | $VB_C$ | $CD_C$ | $VD_C$ |
| ... | ... | ... | ... | ... | ... | ... | ... | ... |
| Z | $CA_Z$ | $VA_Z$ | $CM_Z$ | $VM_Z$ | $CB_Z$ | $VB_Z$ | $CD_Z$ | $VD_Z$ |
| a | $CA_a$ | $VA_a$ | $CM_a$ | $VM_a$ | $CB_a$ | $VB_a$ | $CD_a$ | $VD_a$ |
| b | $CA_b$ | $VA_b$ | $CM_b$ | $VM_b$ | $CB_b$ | $VB_b$ | $CD_b$ | $VD_b$ |
| c | $CA_c$ | $VA_c$ | $CM_c$ | $VM_c$ | $CB_c$ | $VB_c$ | $CD_c$ | $VD_c$ |
| ... | ... | ... | ... | ... | ... | ... | ... | ... |
| z | $CA_z$ | $VA_z$ | $CM_z$ | $VM_z$ | $CB_z$ | $VB_z$ | $CD_z$ | $VD_z$ |
| 0 | $CA_0$ | $VA_0$ | $CM_0$ | $VM_0$ | $CB_0$ | $VB_0$ | $CD_0$ | $VD_0$ |
| 1 | $CA_1$ | $VA_1$ | $CM_1$ | $VM_1$ | $CB_1$ | $VB_1$ | $CD_1$ | $VD_1$ |
| 2 | $CA_2$ | $VA_2$ | $CM_2$ | $VM_2$ | $CB_2$ | $VB_2$ | $CD_2$ | $VD_2$ |
| ... | ... | ... | ... | ... | ... | ... | ... | ... |
| 9 | $CA_9$ | $VA_9$ | $CM_9$ | $VM_9$ | $CB_9$ | $VB_9$ | $CD_9$ | $VD_9$ |

*Fig.5*
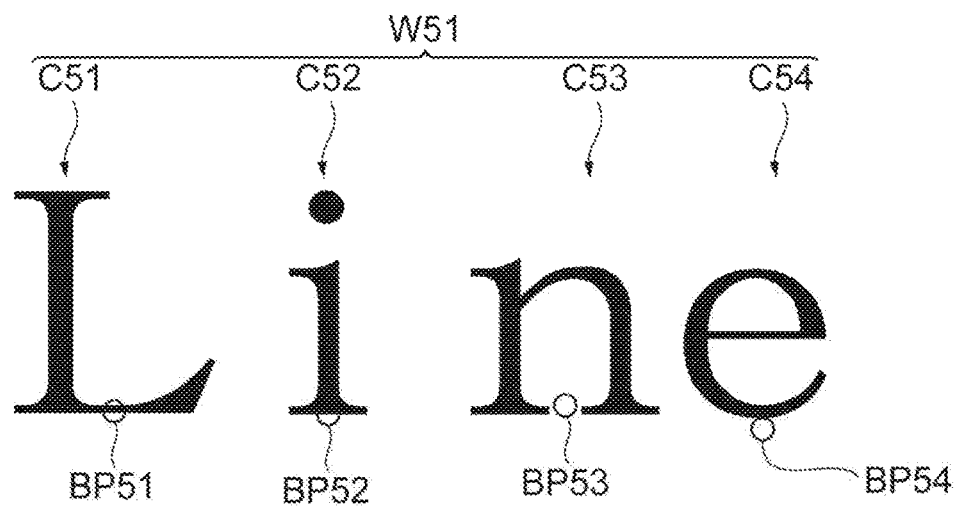
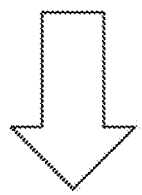
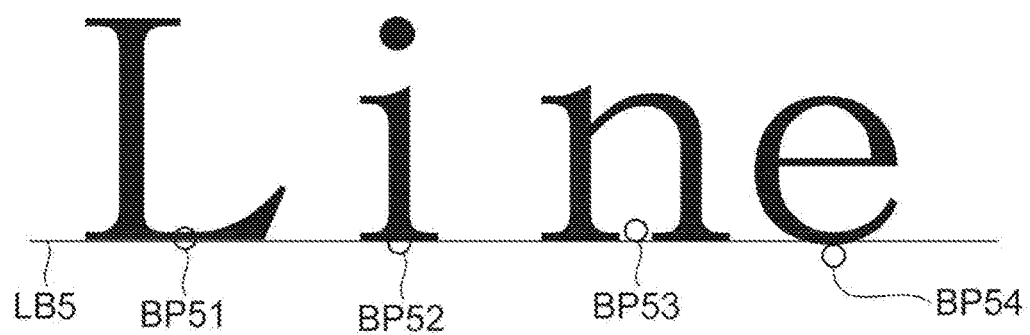

Fig.6
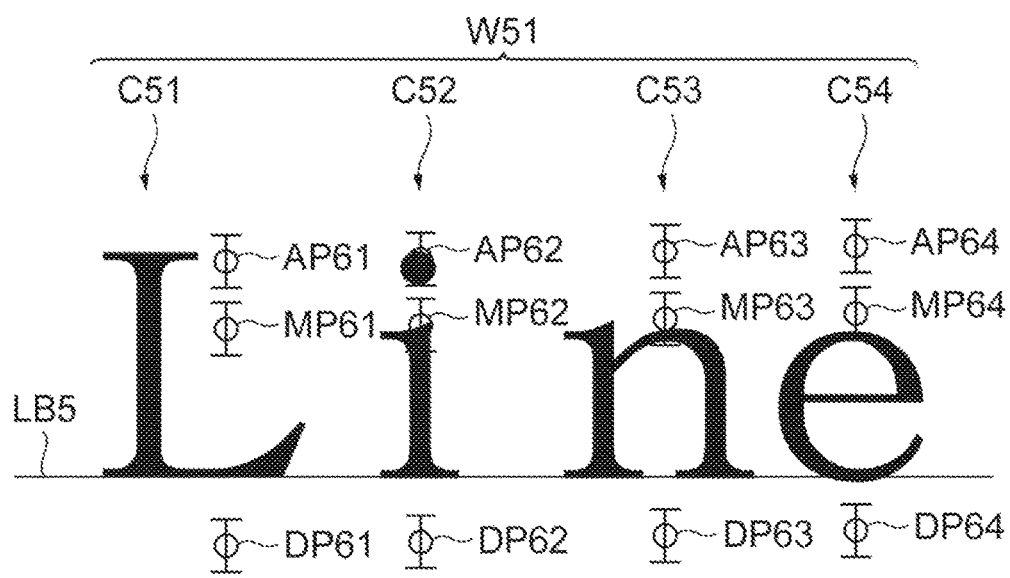
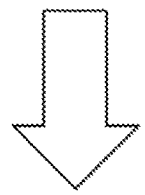
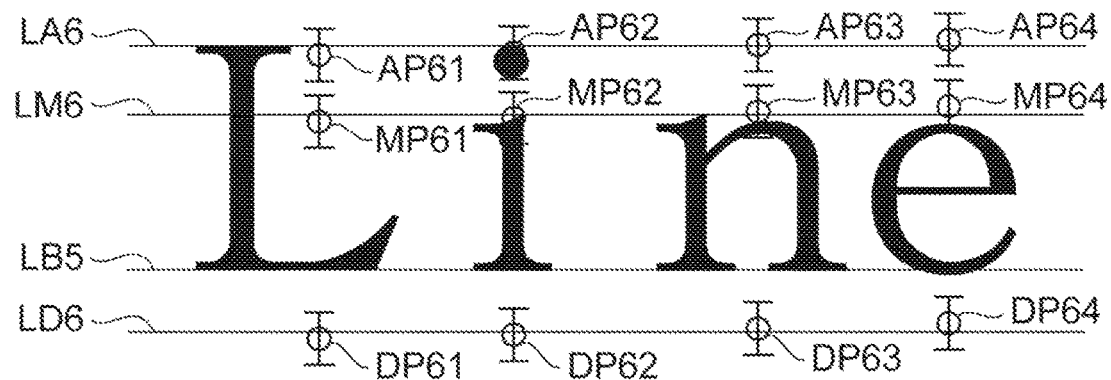

REFERENCE LINE SETTING DEVICE, REFERENCE LINE SETTING METHOD AND REFERENCE LINE SETTING PROGRAM

This application is a National Stage of International Application No. PCT/JP2015/070600 filed Jul. 17, 2015, the contents of all of which are incorporated herein by reference in their entirety.

TECHNICAL FIELD

The present invention relates to a reference line setting device, a reference line setting method, and a reference line setting program.

BACKGROUND ART

There is an increasing demand for a technique to recognize characters from an image taken by a camera or the like. In order to appropriately recognize characters contained in an image, it is required in some cases to set reference lines along which characters are to be placed. For example, a technique that represents the outline of a region where each character is shown by a feature vector and sets reference lines to the character in an image on the basis of the feature vector is known (for example, see Patent Literature 1).

CITATION LIST

Patent Literature

PTL1: United States Patent Publication No. 8588529

SUMMARY OF INVENTION

Technical Problem

However, in the technique according to the related art described above, a character region is not appropriately recognized when the outline of a character in an image is not clear, when the contrast between a character region and its background is not high enough and the like, failing to correctly set reference lines in some cases. As a result, the accuracy of character recognition from an image is degraded.

In view of the foregoing, an object of the present invention is to highly accurately set, to characters contained in an image, reference lines along which characters are to be placed.

Solution to Problem

To solve the above problem, the reference line setting device according to one aspect of the present invention includes an image acquisition means configured to acquire an image containing a character region, a recognition means configured to recognize characters from the character region of the image by a specified recognition method, a line position information acquisition means configured to acquire line position information of a plurality of characters out of the characters recognized by the recognition means with reference to a storage means storing, for each character, line position information concerning coordinate positions in a vertical direction of characters where at least two reference lines extend in an alignment direction of characters, along which a certain part of each character is to be placed, and a setting means configured to set each of the reference lines to the image based on a plurality of line position information for each reference line acquired by the line position information acquisition means.

A reference line setting method according to one aspect of the present invention is a reference line setting method in a reference line setting device, the method including an image acquisition step of acquiring an image containing a character region, a recognition step of recognizing characters from the character region of the image by a specified recognition method, a line position information acquisition step of acquiring line position information of a plurality of characters out of the characters recognized in the recognition step with reference to a storage means storing, for each character, line position information concerning coordinate positions in a vertical direction of characters where at least two reference lines extend in an alignment direction of characters, along which a certain part of each character is to be placed, and a setting step of setting each of the reference lines to the image based on a plurality of line position information for each reference line acquired in the line position information acquisition step.

A reference line setting program according to one aspect of the present invention causes a computer to function as a reference line setting device, the program causing the computer to function as an image acquisition means configured to acquire an image containing a character region, a recognition means configured to recognize characters from the character region of the image by a specified recognition method, a line position information acquisition means configured to acquire line position information of a plurality of characters out of the characters recognized by the recognition means with reference to a storage means storing, for each character, line position information concerning coordinate positions in a vertical direction of characters where at least two reference lines extend in an alignment direction of characters, along which a certain part of each character is to be placed, and a setting means configured to set each of the reference lines to the image based on a plurality of line position information for each reference line acquired by the line position information acquisition means.

According to the above aspects, based on the line position information of characters recognized from an image, reference lines are set to the image containing the characters. Because the line position information is acquired from a storage means that previously stores the line position information for each character, and the reference lines are set on the basis of the acquired line position information, the reference lines can be set with high accuracy. Further, because the reference lines are set on the basis of the line position information of characters that have been able to be recognized, it is possible to set the reference lines highly accurately to the whole character string shown in the image, which contains characters that have not been able to be recognized.

In the reference line setting device according to another aspect, the line position information acquisition means may acquire line position information indicating a position which one first reference line passes through, and the setting means may set the first reference line by a method of least squares based on the line position information of the first reference line of a plurality of characters.

According to the above aspect, because one reference line that serves as a reference for placing characters is set by the method of least squares on the basis of the line position information of the reference line, it is possible to set the reference line highly accurately to a character string shown in an image. The first reference line is a base line for alphabetic characters, for example. Further, the first reference line is a reference line along which the lower end of hiragana, katakana and kanji characters is to be placed, for example.

In the reference line setting device according to another aspect, the line position information may be composed of a mean and a variance of a distribution of coordinate positions in a vertical direction of characters where reference lines extend in an alignment direction of characters, and the setting means may summarize a distribution of the line position information of one reference line out of the reference lines other than the first reference line of a plurality of characters recognized by the recognition means, and set, as the one reference line, a line passing through a position with highest probability obtained by summation of the distribution of the line position information and having the same slope as the first reference line.

In the above aspect, because reference lines other than the first reference line are set to pass through a position at which a probability obtained by summarizing the line position information composed of a mean and a variance is the highest with the same slope as the first reference line that serves as a reference for placing characters, it is possible to appropriately set those reference lines.

In the reference line setting device according to another aspect, the line position information may be composed of a mean and a variance of a distribution of coordinate positions in a vertical direction of characters where reference lines extend in an alignment direction of characters, and the setting means may summarize a distribution of the line position information of two or more reference lines out of the reference lines other than the first reference line of a plurality of characters recognized by the recognition means, and set the two or more reference lines passing through a position with highest probability obtained by summation of the distribution of the line position information and intersecting with the first reference line at one point.

In the above aspect, it is possible to appropriately set a plurality of reference lines that have a different slope from the first reference line and intersect with the first reference line at one point.

In the reference line setting device according to another aspect, the character may be an alphabetic character, the reference lines may include an ascender line, a mean line, a base line and a descender line, the line position information acquisition means may acquire the line position information of the ascender line, the mean line, the base line and the descender line for each character, and the setting means may set each of the reference lines based on the line position information of the ascender line, the mean line, the base line and the descender line of a plurality of characters.

According to the above aspect, because the line position information concerning the ascender line, the mean line, the base line and the descender line are acquired when the character is an alphabetic character, it is possible to set those four reference lines highly accurately.

The reference line setting device according to another aspect may further include a learning means configured to calculate the line position information of each character based on a plurality of images showing a plurality of characters to which the reference lines are set, and store the calculated line position information for each character into the storage means.

According to the above aspect, the position of each reference line for each character is calculated on the basis of a plurality of images showing characters, and the calculated position of the reference line is stored for each character as the line position information in the storage means. It is thereby possible to previously store the line position information to be used for the setting of reference lines with high accuracy.

In the reference line setting device according to another aspect, the learning means may calculate, as the line position information, a mean and a variance of coordinate positions in a vertical direction of characters where each reference line extend in an alignment direction of characters based on the plurality of characters shown in the plurality of images.

According to the above aspect, because the line position information is calculated as a mean and a variance on the basis of characters shown in a plurality of images, it is possible to previously store information about the positions of reference lines as a result of the summation of many images showing characters. It is thereby possible to set the reference lines highly accurately on the basis of such information.

In the reference line setting device according to another aspect, the character may be an alphabetic character, and the line position information acquisition means may acquire the line position information of a character whose uppercase and lowercase versions are not similar in shape.

When a recognized character is a character whose uppercase and lowercase versions are similar in shape, it is highly likely that the determination as to whether the character is an uppercase character or a lowercase character is incorrect. Characters whose uppercase and lowercase versions are similar in shape are alphabetic characters "S" and "s", "O" and "o" and the like, for example. According to the above aspect, because the line position information of a character that is recognized as a character whose uppercase and lowercase versions are similar in shape in recognition results is not used for the setting of a reference line, it is possible to improve the accuracy of the position of the reference line to be set.

In the reference line setting device according to another aspect, the recognition means may calculate a reliability score indicating a probability of results of character recognition from an image, and the line position information acquisition means may acquire the line position information of a character where the reliability score is equal to or more than a specified value.

The position of the reference line that is set on the basis of the line position information of a character with the low reliability in recognition results is not likely to be appropriate as the position of the reference line for a character string containing that character. According to the above aspect, because the line position information of a character where the reliability score in recognition results is less than a specified value is not used for the setting of the reference line, it is possible to improve the accuracy of the position of the reference line to be set.

Advantageous Effects of Invention

According to one aspect of the present invention, it is possible highly accurately set, to characters contained in an image, reference lines along which characters are to be placed.

BRIEF DESCRIPTION OF DRAWINGS

FIG. 4 is a view showing an example of line position information stored in the reference line position storage unit.

FIG. 5 is a view showing an example of setting a base line.

FIG. 6 is a view showing an example of setting an ascender line, a mean line, and a descender line.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
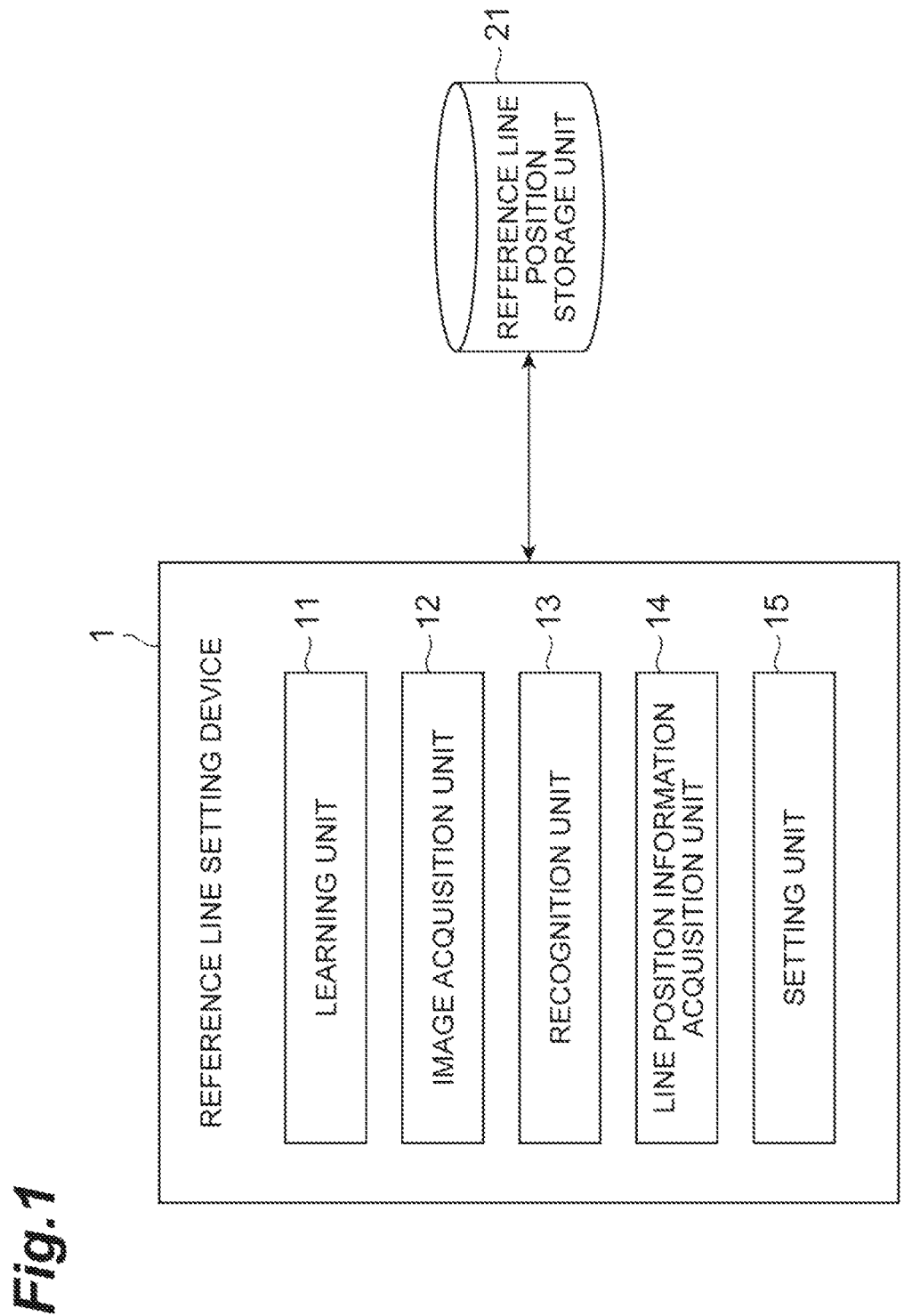
FIG. 1 is a block diagram showing a functional configuration of a reference line setting device.

FIG. 1 is a block diagram showing a functional configuration of a reference line setting device 1 according to this embodiment. The reference line setting device 1 is a device that sets a plurality of reference lines to a character string contained in an image. The reference lines are virtual lines that are drawn in the alignment direction of characters, along which a certain part of each character contained in a character string is to be placed. When the characters are alphabets, there are four reference lines: an ascender line, a mean line, a base line, and a descender line.

The image is an image that is taken by a camera or the like, for example. There is an increasing demand for a technique to recognize characters from an image containing characters, and it is necessary to appropriately set reference lines to a character string in the image in order to achieve accurate character recognition. A scene image taken by a camera or the like contains various kinds of character information such as road signs and advertising signs, for example. Characters in a scene image, compared with characters printed on paper, have many problems that make recognition difficult, such as having a unique font or style and having a low resolution. Because the reference lines set to a character string in an image can restrict a region where characters are shown in the image, the setting of appropriate reference lines contribute to accurate character recognition from the image.

As shown in FIG. 1, the reference line setting device 1 functionally includes a learning unit 11 (learning means), an image acquisition unit 12 (image acquisition means), a recognition unit 13 (recognition means), a line position information acquisition unit 14 (line position information acquisition means), and a setting unit 15 (setting means).

Further, the reference line setting device 1 can access a storage means such as a reference line position storage unit 21. The reference line position storage unit 21 may be included in the reference line setting device 1 or may be configured as an external storage means that is accessible from the reference line setting device 1.

Figure 2:
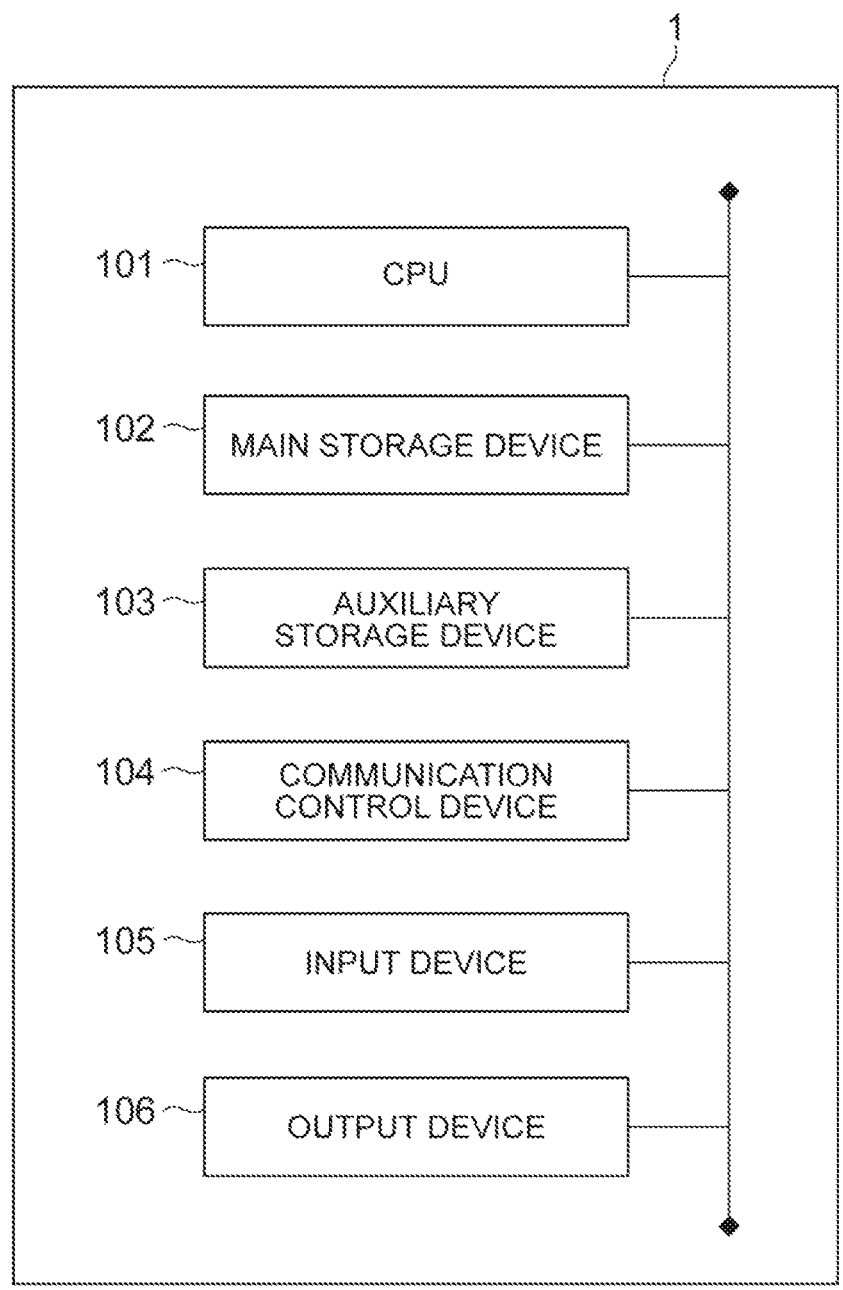
FIG. 2 is a view showing a hardware configuration of a reference line setting device.

FIG. 2 is a hardware configuration diagram of the reference line setting device 1. As shown in FIG. 2, the reference line setting device 1 is physically configured as a computer system that includes a CPU 101, a main storage device 102 such as memory like RAM and ROM, an auxiliary storage device 103 such as a hard disk, a communication control device 104 and the like. The reference line setting device 1 may further include an input device 105 such as a keyboard, a touch panel and a mouse, an output device 106 such as a display and the like.

The functions shown in FIG. 1 are implemented by loading given computer software onto hardware such as the CPU 101 or the main storage device 102 shown in FIG. 2, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

The functional units of the reference line setting device 1 are described hereinafter. The learning unit 11 is a part that calculates line position information about coordinate positions in a vertical direction of characters where each reference line extend in an alignment direction of characters. The learning unit 11 stores the calculated line position information into the reference line position storage unit 21. The line position information is information that indicates the positions of reference lines for each character.

Figure 3:
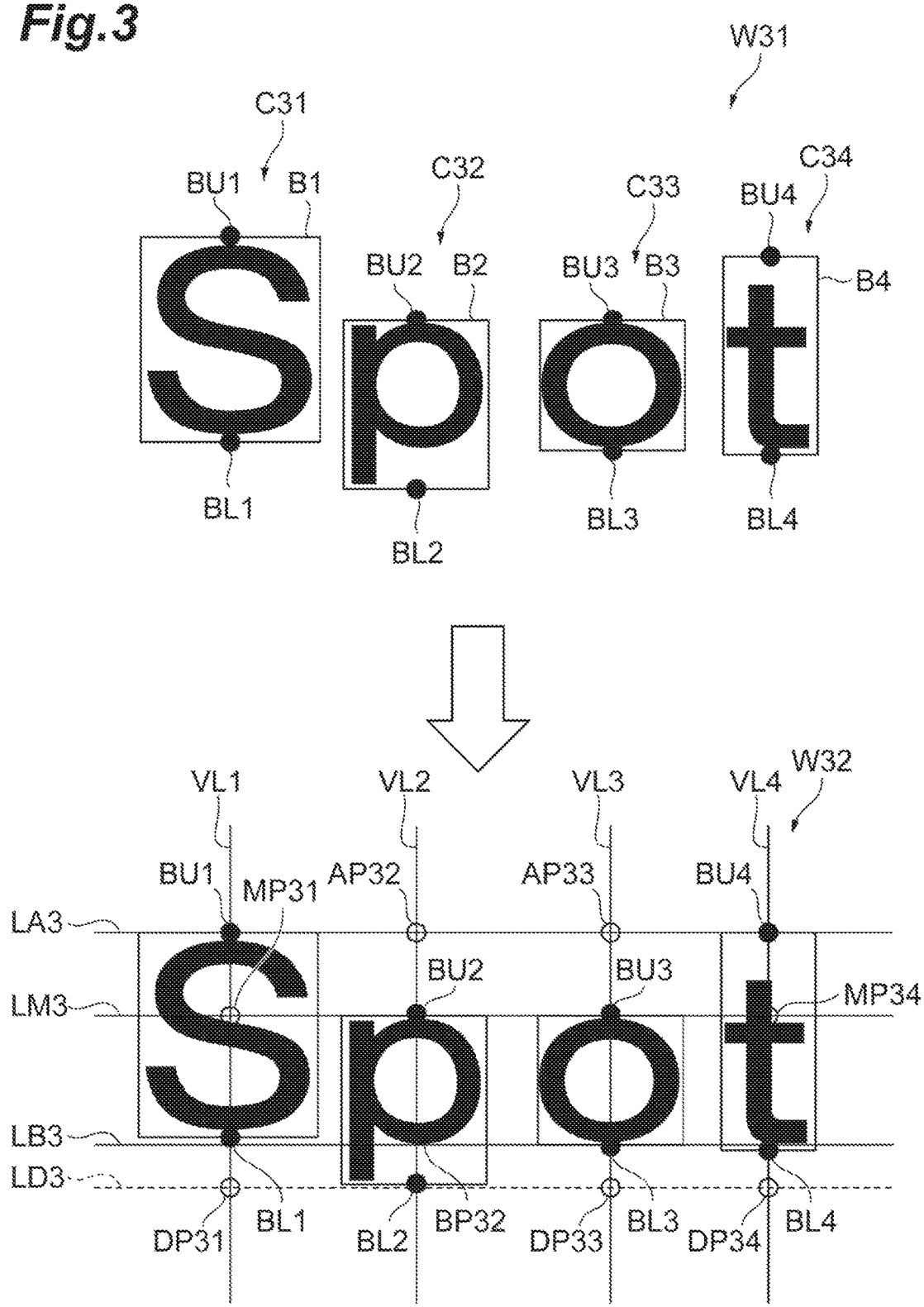
FIG. 3 is a view showing an example of calculating line position information to be stored in a reference line position storage unit.

The calculation of the line position information by the learning unit 11 is described hereinafter with reference to FIG. 3. FIG. 3 is a view showing an example of the calculation of the line position information.

The learning unit 11 acquires, as learning data, an image where characters are shown, in which a bounding box and a character set of each character are given. On the basis of a large amount of learning data, the learning unit 11 acquires information about a portion through which each reference line passes for 62 characters in total: 26 uppercase alphabetic characters, 26 lowercase alphabetic characters and 10 numeric characters from 0 to 9, by the following method, calculates the line position information for each character, and then stores the calculated line position information into the reference line position storage unit 21.

The learning unit 11 first acquires an image containing a character string W31 as an example of learning data. The character string W31 includes characters C31 to C34. A character set and a bounding box are provided in advance for each character. The bounding box is a rectangular frame circumscribing a character region. Specifically, the character set of the character C31 is the uppercase alphabetic character "S". Further, the bounding box B1 is provided for the character C31.

Likewise, the character sets of the characters C32 to C34 are the lowercase alphabetic character "p", the lowercase alphabetic character "o", and the lowercase alphabetic character "t". Further, the bounding boxes B2 to B4 are provided for the characters C32 to C34, respectively.

The learning unit 11 extracts the center of the upper side and the center of the lower side of the bounding box of each character as an upper contact point and a lower contact point, respectively. Specifically, the learning unit 11 extracts, from the bounding box B1, the upper contact point BU1 and the lower contact point BL1. Likewise, the learning unit 11 extracts, from the bounding boxes B2 to B4, the upper contact points BU2 to BU4 and the lower contact points BL2 to BL4, respectively.

The upper contact point and the lower contact point of the uppercase alphabetic characters and the numeric characters correspond to the positions of the ascender line and the base line, respectively. Further, the upper contact point and the lower contact point of the lowercase alphabetic characters b, d, f, h, i, k, l and t correspond to the positions of the ascender line and the base line, respectively. Further, the upper contact point and the lower contact point of the lowercase alphabetic characters g, j, p, q and y correspond to the positions of the mean line and the descender line, respectively. The upper contact point and the lower contact point of the other lowercase alphabetic characters correspond to the positions of the mean line and the base line, respectively.

The learning unit 11 sets reference lines to a character string of an image by using a plurality of points corresponding to the positions of the respective reference lines out of the extracted upper contact points and the lower contact points. In the example of FIG. 3, the learning unit 11 sets the reference lines as shown in the character string W32. Specifically, with use of the two upper contact points BU1 and BU4, the learning unit 11 sets the ascender line LA3 to the character string W32 by the method of least squares.

Likewise, with use of the two upper contact points BU2 and BU3, the learning unit 11 sets the mean line LM3 to the character string W32 by the method of least squares. Further, with use of the three lower contact points BL1, BL3 and BL4, the learning unit 11 sets the base line LB3 to the character string W32 by the method of least squares.

Note that, in order to set lines by the method of least squares, information of two points or more is required. In the example of FIG. 3, because the point corresponding to the position of the descender line is only the lower contact point BL2, the descender line LD3, which is indicated by a dotted line, is not set. The learning unit 11 calculates the line position information on the basis of a large amount of learning data, and therefore it is possible to calculate the line position information of the descender line by acquiring an image that contains a plurality of characters having the lower contact point corresponding to the position of the descender line as the learning data.

The learning unit 11 acquires the positions at which each of the set reference lines intersects with vertical lines VL1 to VL4 that pass through the center of the bounding box of each character as the line position of each reference line in each character. In the example of FIG. 3, the learning unit 11 acquires the positions of the upper contact point BU1, the point MP31 and the lower contact point BL1 as the positions of the ascender line, the mean line and the base line of the character C31, which is the uppercase alphabetic character "S". Note that, if the descender line LD3 is set, the learning unit 11 acquires the position of the point DP31 as the position of the descender line of the character C31, which is the uppercase alphabetic character "S". Note that the learning unit 11 converts the position of each reference line in each character into a value that is normalized by the height of each character region (bounding box).

Likewise, the learning unit 11 acquires the positions of point AP31, the upper contact point BU2, the point BP32 and the lower contact point BL2 as the positions of the ascender line, the mean line, the base line and the line of the character C32, which is the lowercase alphabetic character "p".

Further, the learning unit 11 acquires the positions of the point AP33, the upper contact point BU3 and the lower contact point BL3 as the positions of the ascender line, the mean line and the base line of the character C33, which is the lowercase alphabetic character "o". Note that, if the descender line LD3 is set, the learning unit 11 acquires the position of the point DP33 as the position of the descender line of the character C33, which is the lowercase alphabetic character "o".

Further, the learning unit 11 acquires the positions of the upper contact point BU4, the point BP34 and the lower contact point BL4 as the positions of the ascender line, the mean line and the base line of the character C34, which is the lowercase alphabetic character "t". Note that, if the descender line LD3 is set, the learning unit 11 acquires the position of the point DP34 as the position of the descender line of the character C34, which is the lowercase alphabetic character "t".

The learning unit 11 performs the above-described processing of acquiring the positions of the reference lines of each character for a wide variety of images and different types of fonts to which a character set and a bounding box for each character are provided, and thereby accumulates and learns a large amount of information about the positions of the reference lines for every character. Then, the learning unit 11 calculates the line position information on the basis of the accumulated and learned information.

For example, the learning unit 11 calculates, as the line position information, the mean of the position of each reference line for each character set, and stores the calculated line position information into the reference line position storage unit 21. Further, the learning unit 11 may calculate, as the line position information, the Gaussian distribution that is obtained by statistically processing a large amount of information about the positions of the reference lines for every character. In this case, the learning unit 11 stores the mean and the variance of the position of each reference line for each character set as the line position information into the reference line position storage unit 21.

FIG. 4 is a view schematically showing the structure of the reference line position storage unit 21 and an example of data stored therein: As shown in FIG. 4, the reference line position storage unit 21 stores the line position information of the ascender line, the mean line, the base line and the descender line for each of uppercase alphabetic characters, lowercase alphabetic characters, and numeric characters. In this embodiment, the line position information contains the mean and the variance of the position of each reference line.

Referring back to FIG. 2, the image acquisition unit 12 is a part that acquires an image containing a character region. The image acquisition unit 12 acquires an image taken by a camera, for example, as an image for which reference lines are to be set.

The recognition unit 13 is a part that recognizes characters from a character region contained in an image by a specified recognition method. For example, the recognition unit 13 may extract a connected region where the same color continues in the image, and acquire the extracted connected region as the character region. For the extraction of the connected region, the recognition unit 13 may perform binarization of the image.

For example, the recognition unit 13 may perform character recognition in the character region by using a so-called character classifier. The method using a character classifier is a known method called HOG (Histogram of Oriented Gradient)-SVM(Support Vector Machine), for example. The HOG-SVM is a method that uses the HOG feature quantity as a feature quantity and uses a known SVM as a classifier. Information to be referred to for character recognition by the character classifier is previously stored in a storage means, and the storage means stores data that is referred to for character recognition using the character classifier by the HOG-SVM, such as data that is learned about uppercase alphabetic characters A to Z, lowercase alphabetic characters a to z, and numeric characters 0 to 9, for example.

The HOG feature quantity is a feature quantity that represents the gradient direction of the luminance of a local region (cell) in an image by a histogram. Cells composed of a specified number of pixels are set to be arranged all over an image from which characters are to be recognized, a multi-dimensional feature vector of the HOG feature quantity is acquired for each cell, and further a multi-dimensional feature vector of all connected cells is acquired from the whole image. Note that, in character classification by the HOG-SVM, it is preferred to further use the aspect ratio.

The recognition unit 13 acquires the HOG feature vector and the aspect ratio vector from the character region. The recognition unit 13 then performs classification using the SVM classifier by reference to the learning data previously stored in the storage means. As a result of classification, the recognition unit 13 can acquire characters (alphabetic characters and numeric characters) and reliability scores output from the classifier.

Note that the recognition that is performed by the recognition unit 13 is not limited to a method by a character classifier such as the HOG-SVM. Because a purpose of character recognition by the recognition unit 13 is not to output accurate character recognition results, various known methods may be applied as long as it can recognize characters from an image. Note that, as described later, a specified recognition method is preferably a method that can acquire information about the reliability of a result of recognition of each character.

The character string W51 shown in FIG. 5 is a character string composed of characters C51 to C54 that have been recognized by the recognition unit 13. Specifically, in the example shown in FIG. 5, the recognition unit 13 outputs, as a result of character recognition from the image, the character "C51", which is the uppercase alphabetic character "L", the character "C52", which is the lowercase alphabetic character "i", the character "C53", which is the lowercase alphabetic character "n", and the character "C54", which is the lowercase alphabetic character "n".

The line position information acquisition unit 14 acquires the line position information of a plurality of characters out of the characters recognized by the recognition unit 13. To be specific, the line position information acquisition unit 14 acquires the line position information from the reference line position storage unit 21.

The setting unit 15 sets each reference line to the image on the basis of the plurality of line position information for each reference line acquired by the line position information acquisition unit 14.

A process of setting the reference lines in this embodiment is specifically described with reference to FIGS. 5 and 6. First, the setting unit 15 sets a first reference line. The first reference line is a reference line that serves as a reference for placing characters, and, for example, it is a base line for alphabetic characters. Further, the first reference line is a reference line along which the lower end of hiragana, katakana and kanji characters is to be placed, for example. The setting unit 15 may set the first reference line by the method of least squares. FIG. 5 is a view showing an example of setting a base line. FIG. 6 is a view showing an example of setting an ascender line, a mean line and a descender line, which are reference lines other than a base line.

The line position information acquisition unit 14 acquires the line position information BP51 to BP54 of the base line of the characters C51 to C54 in the character string W51 shown in FIG. 5. In this embodiment, the line position information acquisition unit 14 acquires the mean value of the line position information of the base line.

Next, based on the line position information of the base line of a plurality of recognized characters, the setting unit 15 sets the base line by the method of least squares. In this embodiment, the setting unit 15 sets the base line LB5 calculated by the method of least squares to the image that contains the character string W51 based on the line position information BP51 to BP54 of the base line of the characters C51 to C54.

Then, the line position information acquisition unit 14 acquires the line position information of the ascender line, the mean line and the descender line for each of the characters C51 to C54 in order to set the ascender line, the mean line and the descender line.

As shown in the character string W51 of FIG. 6, the line position information acquisition unit 14 acquires the line position information AP61, MP61 and DP61 of the ascender line, the mean line and the descender line, respectively, of the character C51. The acquired line position information AP61, MP61 and DP61 is represented as the distribution of the positions of the reference lines in the character, which includes the mean and the variance. Likewise, the line position information acquisition unit 14 acquires the line position information AP62, MP62 and DP62, the line position information AP63, MP63 and DP63, and the line position information AP64, MP64 and DP64 of the ascender line, the mean line and the descender line of the characters C52 to C54, respectively.

After that, the setting unit 15 summarizes the distribution of the line position information of a reference line other than the base line of the plurality of recognized characters, and sets, as the reference line, a line that passes through the position with the highest probability obtained by the summation of the distribution of the line position information and that has the same slope as the base line.

The setting of the three reference lines other than the base line is specifically described hereinafter. An arbitrary two-dimensional coordinate system is set to an image that contains a character region, one reference line 1 among the three reference lines other than the base line is represented by the equation $y = kx + b_1$ where k is the slope and $b_1$ is the intercept. The slope k is the same as the slope of the base line that has been already set.

Further, for the reference line 1, a value that maximizes the likelihood when the slope k is determined can be set as the intercept. It is assumed that, when a character region of N number of characters is given in the acquired image, $c_1, c_2, \ldots, c_N$ is the character class of each character, and $x_1, x_2, \ldots, x_N$ is the position in the x direction of the coordinate system of the center in the crosswise direction of the character region of each character. When $p(y_{il}|c_i)$ is the probability that the intercept at $x_i$ of the reference line 1 is $y_i$ when the i-th character class is $c_i$, the intercept $b_1$ of the reference line 1 is calculated by the following equation (1):

$$b_l = \arg_{b_l}\max \sum_{i=1}^{N} \ln p(y_{il} | c_i)$$

$$= \arg_{b_l}\max \sum_{i=1}^{N} -\frac{(\mu_{l_{c_i}} - y_{il})^2}{2\sigma_{l_{c_i}}^2}$$

$$= \frac{\sum_{i=1}^{N} \frac{1}{\sigma_{l_{c_i}}^2}(\mu_{l_{c_i}} - kx_i))}{\sum_{i=1}^{N} \frac{1}{\sigma_{l_{c_i}}^2}}$$

where $\|_{lci}$ and $\sigma_{lci}$ are the mean and the variance of the position of the reference line 1 for each character class $c_i$ obtained as the line position information.

As indicated by the arrow in FIG. 6, the setting unit 15 sets the ascender line LA6 based on the line position information AP61 to AP64 of the ascender line of the characters C51 to C54. Specifically, the ascender line LA6 is set at the position with the highest probability in the distribution calculated by the summation of the mean and the variance of the line position information AP61 to AP64.

Likewise, the setting unit 15 sets the mean line LM6 based on the line position information MP61 to MP64 of the ascender line of the characters C51 to C54. Further, the setting unit 15 sets the descender line LD6 based on the line position information DP61 to DP64 of the descender line of the characters C51 to C54.

In the case where the recognition unit 13 calculates and outputs a reliability score indicating the probability of results of character recognition from an image, the line position information acquisition unit 14 may acquire the line position information of a character where the reliability score calculated by the recognition unit 13 is a specified value or more. For example, in the example of FIGS. 5 and 6, when the reliability scores in the recognition results of the characters C51 and C54 are a specified value or more, and the reliability scores in the recognition results of the characters C52 and C53 are less than a specified value, the position information acquisition unit 14 acquire the line position information of the characters C51 and C54. Thus, the setting unit 15 uses only the line position information of the characters C51 and C54 for the setting of the reference lines, and does not use the line position information of the characters C52 and C53 for the setting of the reference lines.

Because the position of the reference line that is set on the basis of the line position information of a character with the low reliability in recognition results is not likely to be appropriate as the position of the reference line for a character string containing that character, by not using the line position information of a character where the reliability score in recognition results is less than a specified value for the setting of the reference line, it is possible to improve the accuracy of the position of the reference line to be set. Further, it is possible to set the reference line in an appropriate position for a character where the reliability in recognition results is low.

Further, when a character for which recognition and setting of reference lines are to be performed is an alphabetic character, the line position information acquisition unit 14 may acquire the line position information of a character whose uppercase and lowercase versions are not similar in shape. In this case, the setting unit 15 does not use, for the setting of reference lines, the line position information of a character that is recognized as an uppercase character or a lowercase character of the character whose uppercase and lowercase versions are similar in shape. Specifically, when the character recognized by the recognition unit 13 is an uppercase character or a lowercase character of the character whose uppercase and lowercase versions are similar in shape, it is highly likely that the determination as to whether the character is an uppercase character or a lowercase character is incorrect. In light of such a possibility, it is possible to improve the accuracy of the position of the reference line to be set by not using, for the setting of the reference line, the line position information of the character that is recognized as a character whose uppercase and lowercase versions are similar in shape in recognition results.

Note that, although the case where the slope of the reference lines other than the base line is the same as the slope of the base line is shown in this embodiment, the slope of the reference lines other than the base line may be different from the slope of the base line. For example, each reference line may have the slope with which the four reference lines converge at one point.

Specifically, the setting unit 15 may summarize the distribution of the line position information of two or more reference lines other than the base line of a plurality of characters recognized by the recognition unit 13, and set the two or more reference lines that pass through the position with the highest probability obtained by the summation of the distribution of the line position information and that intersect with the base line at one point.

Further, although the case where the base line is a straight line is shown in this embodiment, the base line may be a quadratic curve, a Bezier curve or a spline curve, for example. When the base line is such a curve also, the base line can be calculated by the method of least squares or another known method based on the line position information indicating the position of the base line. When the base line is such a curve, the ascender line, the mean line and the descender line may be calculated as lines having the same curve as the base line.

Figure 7:
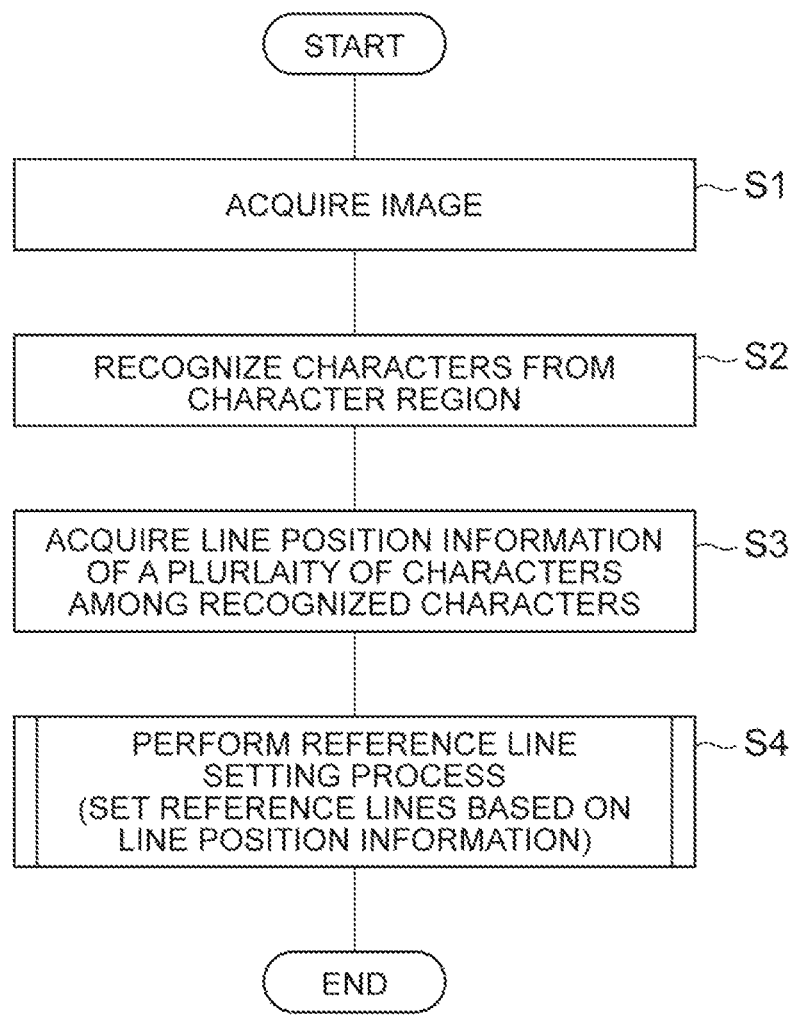
FIG. 7 is a flowchart showing a process of a reference line setting method performed in a reference line setting device.
Figure 8:
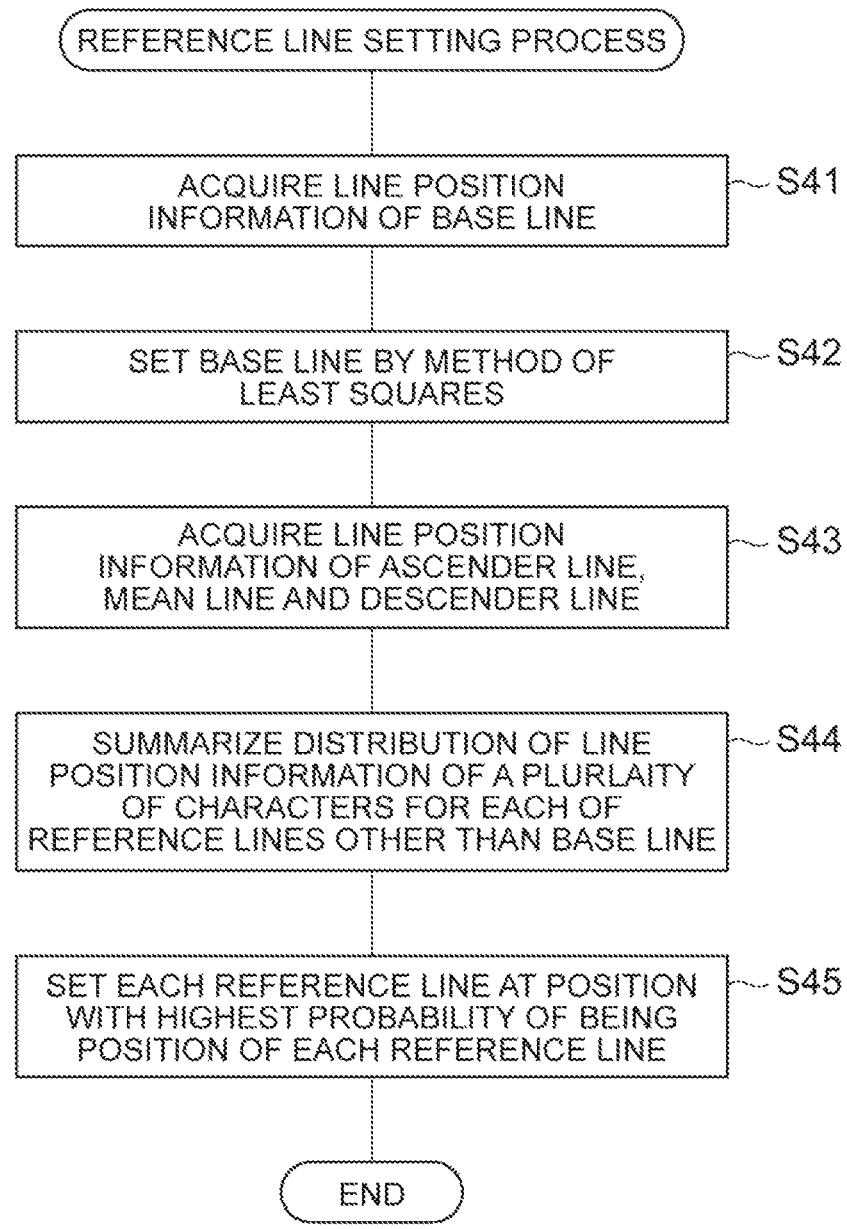
FIG. 8 is a flowchart showing the detail of the reference line setting process in FIG. 7.

The operation of the reference line setting device 1 according to this embodiment is described hereinafter with reference to FIGS. 7 and 8. FIG. 7 is a flowchart Showing a process of a reference line setting method performed in the reference line setting device 1.

First, the image acquisition unit 12 acquires an image containing a character region (S1). Next, the recognition unit 13 recognizes characters from the character region contained in the image by a specified recognition method (S2).

Then, the line position information acquisition unit 14 acquires the line position information of a plurality of characters out of the characters recognized by the recognition unit 13 (S3). To be specific, the line position information acquisition unit 14 acquires the line position information from the reference line position storage unit 21. The line position information stored in the reference line position storage unit 21 has been calculated on the basis of a plurality of characters shown in various images by the learning unit 11.

After that, the setting unit 15 performs a reference line setting process that sets reference lines based on the line position information acquired in Step S3 (S4). The reference line setting process in Step S4 is described with reference to FIG. 8.

First, the line position information acquisition unit 14 acquires the line position information of the base line of each recognized character (S41). Next, the setting unit 15 sets the base line by the method of least squares based on the line position information of the base line acquired in Step S41 (S42).

Then, the line position information acquisition unit 14 acquires the line position information of the ascender line, the mean line and the descender line of each recognized character (S43). After that, the setting unit 15 summarizes the distribution of the line position information of a plurality of recognized characters for each of the reference lines other than the base line (S44). Specifically, the setting unit 15 summarizes the distribution of the positions of the reference lines represented by the line position information for each of the ascender line, the mean line and the descender line.

The setting unit 15 then sets, as the reference line, a line that passes through the position with the highest probability obtained by the summation of the distribution of the line position information and that has the same slope as the base line (S45).

Figure 9:
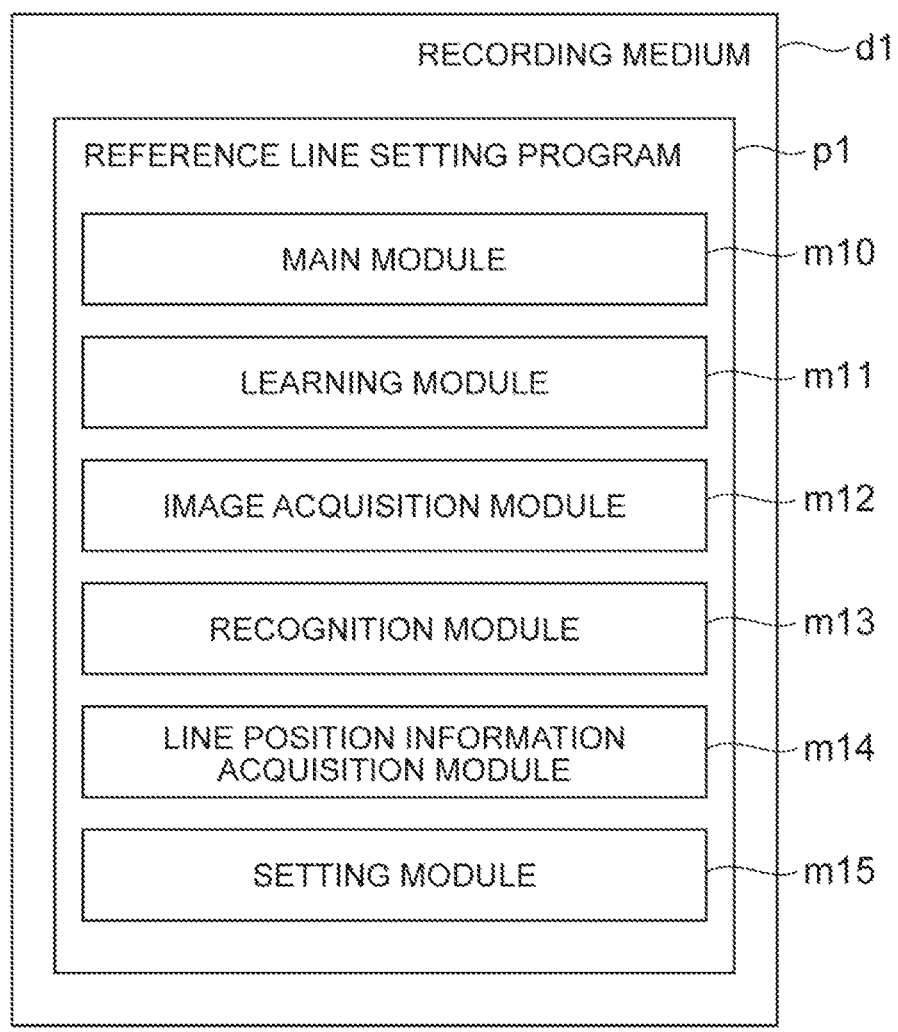
FIG. 9 is a view showing a structure of a reference line setting program.

A reference line setting program that causes a computer to function as the reference line setting device 1 is described hereinafter with reference to FIG. 9. A reference line setting program p1 includes a main module m10, a learning module m11, an image acquisition module m12, a recognition module m13, a line position information acquisition module m14 and a setting module m15.

The main module m10 is a part that exercises control over the reference line setting. The functions implemented by executing the learning module m11, the image acquisition module m12, the recognition module m13, the line position information acquisition module m14 and the setting module m15 are respectively equal to the functions of the learning unit 11, the image acquisition unit 12, the recognition unit 13, the line position information acquisition unit 14 and the setting unit 15 of the reference line setting device 1 shown in FIG. 1.

The reference line setting program p1 is provided by a storage medium d1 such as CD-ROM, DVD-ROM or semiconductor memory, for example. Further, the reference line setting program p1 may be provided as a computer data signal superimposed onto a carrier wave through a communication network.

According to the reference line setting device 1, the reference line setting method and the reference line setting program p1 described above, based on the line position information of characters recognized from an image, reference lines are set to the image containing the characters. Because the line position information is acquired from a storage means that previously stores the line position information for each character, and the reference lines are set on the basis of the acquired line position information, the reference lines can be set with high accuracy. Further, because the reference lines are set on the basis of the line position information of characters that have been able to be recognized, it is possible to set the reference lines highly accurately to the whole character string shown in the image, which contains characters that have not been able to be recognized.

An embodiment of the present invention is described in detail above. However, the present invention is not limited to the above-described embodiment. Various changes and modifications may be made to the present invention without departing from the scope of the invention.

For example, although this embodiment is described using the example of setting reference lines to an alphabetic character string contained in an image, it is not limited to this example. The present invention may be applied to other types of characters, and it is applicable to a Japanese character string, for example. In this case, the number of reference lines to be set may be two or three, for example, rather than four in the case of alphabetic characters. For example, when a character string is composed of hiragana, katakana and kanji characters, two reference lines may be set at the lower end and the upper end of the characters. Further, the third reference line may be set in the middle of the two reference lines at the lower end and the upper end of the characters.

REFERENCE SIGNS LIST

1 . . . reference line setting device, 11 . . . learning unit, 12 . . . image acquisition unit, 13 . . . recognition unit, 14 . . . line position information acquisition unit, 15 . . . setting unit, 21 . . . reference line position storage unit, d1 . . . storage medium, p1 . . . reference line setting program, m10 . . . main module, m11 . . . learning module, m12 . . . image acquisition module, m13 . . . recognition module, m14 . . . line position information acquisition module, m15 . . . setting module

The invention claimed is:

1. A reference line setting device comprising:
at least one memory configured to store computer program code;
at least one processor configured to access said computer program code and operate as instructed by said computer program code, said computer program code including:
image acquisition code configured to cause at least one of said at least one processor to acquire an image containing a character region;
line position information acquisition code configured to cause at least one of said at least one processor to acquire line position information of a plurality of characters out of characters recognized from the character region of the image by a specified recognition method with reference to a storage means storing, for each character, line position information concerning coordinate positions in a vertical direction of characters where at least two reference lines extend in an alignment direction of characters, along which a certain part of each character is to be placed; and
setting code configured to cause at least one of said at least one processor to set each of the reference lines to the image based on a plurality of line position information for each reference line acquired.

2. The reference line setting device according to claim 1, wherein
the line position information acquisition code is configured to cause at least one of said at least one processor to acquire line position information indicating a position in which a first reference line passes through, and
the setting code is configured to cause at least one of said at least one processor to set the first reference line by a method of least squares based on the line position information of the first reference line of a plurality of characters.

3. The reference line setting device according to claim 2, wherein
the line position information is composed of a mean and a variance of a distribution of the coordinate positions in the vertical direction of characters where reference lines extend in the alignment direction of characters, and
the setting code is configured to cause at least one of said at least one processor to summarize a distribution of the line position information of one reference line out of the reference lines other than the first reference line of a plurality of characters recognized from the character region of the image, and set, as the one reference line, a line passing through a position with highest probability obtained by summation of the distribution of the line position information and having the same slope as the first reference line.

4. The reference line setting device according to claim 2, wherein
the line position information is composed of a mean and a variance of a distribution of the coordinate positions in the vertical direction of characters where reference lines extend in the alignment direction of characters, and the setting code is configured to cause at least one of said at least one processor to summarize a distribution of the line position information of two or more reference lines out of the reference lines other than the first reference line of a plurality of characters recognized from the character region of the image, and set the two or more reference lines passing through a position with highest probability obtained by summation of the distribution of the line position information and intersecting with the first reference line at one point.

5. The reference line setting device according to claim 1, wherein
the character is an alphabetic character,
the reference lines include an ascender line, a mean line, a base line and a descender line,
the line position information acquisition code is configured to cause at least one of said at least one processor to acquire the line position information of the ascender line, the mean line, the base line and the descender line for each character, and
the setting code is configured to cause at least one of said at least one processor to set each of the reference lines based on the line position information of the ascender line, the mean line, the base line and the descender line of a plurality of characters.

6. The reference line setting device according to claim 1, further comprising:
learning code configured to cause at least one of said at least one processor to calculate the line position information of each character based on a plurality of images showing a plurality of characters to which the reference lines are set, and store the calculated line position information for each character into the storage means.

7. The reference line setting device according to claim 6, wherein
the learning code is configured to cause at least one of said at least one processor to calculate, as the line position information, a mean and a variance of the coordinate positions in the vertical direction of characters where each reference line extend in the alignment direction of characters based on the plurality of characters shown in the plurality of images.

8. The reference line setting device according to claim 1, wherein
the character is an alphabetic character, and
the line position information acquisition code is configured to cause at least one of said at least one processor to acquire the line position information of a character whose uppercase and lowercase versions are not similar in shape.

9. The reference line setting device according to claim 1, wherein
the line position information acquisition code is configured to cause at least one of said at least one processor to acquire the line position information of a character where a reliability score indicating a probability of results of character recognition from the image is equal to or more than a specified value.

10. The reference line setting device according to claim 1, wherein the alignment direction of characters include a horizontal direction.

11. A reference line setting method in a reference line setting device, the method comprising:
acquiring an image containing a character region;
acquiring line position information of a plurality of characters out of characters recognized from the character region of the image by a specified recognition method with reference to a storage means storing, for each character, line position information concerning coordinate positions in a vertical direction of characters where at least two reference lines extend in an alignment direction of characters, along which a certain part of each character is to be placed; and
setting each of the reference lines to the image based on a plurality of line position information for each reference line acquired.

\* \* \* \* \*